United States Patent
Perlman et al.

(10) Patent No.: US 6,539,407 B1
(45) Date of Patent: *Mar. 25, 2003

(54) METHOD AND APPARATUS FOR REDUCING FLICKER WHEN DISPLAYING HTML IMAGES ON A TELEVISION MONITOR

(75) Inventors: Stephen G. Perlman, Mountain View, CA (US); Bruce Leak, Palo Alto, CA (US)

(73) Assignee: WebTV Networks, Inc., Mountain View, CA (US)

( * ) Notice: Subject to any disclaimer, the term of this patent is extended or adjusted under 35 U.S.C. 154(b) by 218 days.

This patent is subject to a terminal disclaimer.

(21) Appl. No.: 09/717,977

(22) Filed: Nov. 21, 2000

Related U.S. Application Data

(63) Continuation of application No. 09/065,814, filed on Apr. 23, 1998, now Pat. No. 6,173,296, which is a continuation of application No. 08/677,915, filed on Jul. 9, 1996, now Pat. No. 5,745,909.

(51) Int. Cl.[7] .................................................. G06T 5/00
(52) U.S. Cl. ........................................ 707/513; 345/428
(58) Field of Search ............................. 707/513, 501.1, 707/526; 345/428, 436

(56) References Cited

U.S. PATENT DOCUMENTS

| | | | |
|---|---|---|---|
| 4,852,151 A | 7/1989 | Dittakavi et al. | 379/97 |
| 4,922,523 A | 5/1990 | Hashimoto | 379/96 |
| 4,975,944 A | 12/1990 | Cho | 379/209 |
| 4,995,074 A | 2/1991 | Goldman et al. | 379/97 |
| 5,005,011 A | 4/1991 | Perlman et al. | 340/728 |
| 5,095,494 A | 3/1992 | Takashi et al. | 375/10 |
| 5,241,587 A | 8/1993 | Horton et al. | 379/92 |
| 5,263,084 A | 11/1993 | Chaput et al. | 379/215 |
| 5,287,401 A | 2/1994 | Lin | 379/98 |
| 5,299,307 A | 3/1994 | Young | 395/161 |
| 5,325,423 A | 6/1994 | Lewis | 379/90 |
| 5,341,293 A | 8/1994 | Vertelney et al. | 364/419.17 |
| 5,357,581 A | 10/1994 | Hadgis | 382/9 |
| 5,369,688 A | 11/1994 | Tsukamoto et al. | 379/100 |
| 5,410,541 A | 4/1995 | Hotto | 370/76 |
| 5,425,092 A | 6/1995 | Quirk | 379/215 |
| 5,469,540 A | 11/1995 | Powers, III et al. | 395/158 |
| 5,488,411 A | 1/1996 | Lewis | 348/8 |
| 5,490,208 A | 2/1996 | Remillard | 379/96 |

(List continued on next page.)

OTHER PUBLICATIONS

Yoshida, "PC makers aiming for living room seat", Electronic Engineering Times, Jan. 95, p. 1.

Lemay, Teach Yourself Web Publishing with HTML in a Week, Sams Publishing, 1995, pp. 13–20, 50–55 and 312–318.

(List continued on next page.)

Primary Examiner—Stephen S. Hong
(74) Attorney, Agent, or Firm—Workman, Nydegger & Seeley

(57) ABSTRACT

A method and system are provided for reducing flicker of an image defined in HTML format for display on a television monitor. When an image is retrieved from a server by a user browser system that uses a television monitor and a dedicated computer system to display HTML documents, analysis is performed on the image to determine whether the image exhibits a tendency to interlace flicker if such an image were to be displayed unmodified on the television monitor. If the analysis indicates that the image would exhibit a tendency to interlace flicker, the dedicated computer system identifies a flicker reduction filter that reduces the interlace flicker. The dedicated computer system applies the filter to the images before it is displayed on the television monitor. Otherwise, the dedicated computer system displays the image as retrieved from the server without flicker reduction filtering.

13 Claims, 2 Drawing Sheets

U.S. PATENT DOCUMENTS

| | | | |
|---|---|---|---|
| 5,510,843 A | 4/1996 | Keene et al. | 348/446 |
| 5,526,055 A | 6/1996 | Zhang et al. | 348/510 |
| 5,538,255 A | 7/1996 | Barker | 463/41 |
| 5,561,709 A | 10/1996 | Remillard | 379/96 |
| 5,564,001 A | 10/1996 | Lewis | 395/154 |
| 5,612,730 A | 3/1997 | Lewis | 348/8 |
| 5,627,555 A | 5/1997 | den Hollander | 345/12 |
| 5,745,909 A | 4/1998 | Perlman et al. | 707/513 |
| 6,173,296 B1 * | 1/2001 | Perlman et al. | 707/513 |

OTHER PUBLICATIONS

Rosoff, Matt, Review: "Gateway Destination PC," c/net inc., 2 pages, Feb. 19, 1996.

Seidman, Robert, Article: "What Larry and Lou Know (That You Don't)," c/net inc., 2 pages, Jan. 29, 1996.

Stellin, Susan, Article: "The $500 Web Box: Less is More?," c/net inc., 2 pages, 1996.

* cited by examiner

METHOD AND APPARATUS FOR REDUCING FLICKER WHEN DISPLAYING HTML IMAGES ON A TELEVISION MONITOR

RELATED APPLICATIONS

This is a continuation of U.S. patent application Ser. No. 09/065,814, filed Apr. 23, 1998, now U.S. Pat. No. 6,173,296, and entitled "Method and Apparatus for Reducing Flicker When Displaying HTML Images on a Television Monitor" which is a continuation of U.S. patent application Ser. No. 08/677,915, filed Jul. 9, 1996, now issued as U.S. Pat. No. 5,745,909, and entitled "Method and Apparatus for Reducing Flicker When Displaying HTML Images on a Television Monitor." The foregoing patent application and patent are incorporated herein by reference.

FIELD OF THE INVENTION

The present invention relates to data processing in computer systems, and in particular, to reducing flicker when displaying HTML images on a television monitor.

BACKGROUND OF THE INVENTION

Networking technology has developed a large network of networks, referred to as the Internet, which interconnects millions of computers around the world. The Internet allows the transfer of data between any number of computer systems connected to the Internet using the Transmission Control Protocol/Internet Protocol (TCP/IP). Computers responding to service requests from other computers, via the Internet, are commonly referred to as servers, and computers that initiate requests for service from a server are referred to as clients.

The Internet has become very popular in part due to the World Wide Web (WWW), which is a network of links to hypertext documents operating within the Internet. These hypertext documents are referred to as either Web documents, Web pages, or hypertext documents. Web documents are embedded with directly accessible connections or links to other documents which create a non-linear way of reading the document. The links are embedded in Web documents as a phrase of text or an image which can be selected and activated by a computer user. Information about the Web documents are controlled and provided by Web servers. At the user's end, a Web client takes the user's requests and passes them on to the Web server.

The Web documents are written with a high level programming language referred to as the Hypertext Markup Language (HTML). Commands of the HTML, hereinafter referred to as tags, provide a variety of functions including, but not limited to, defining special format and layout information in a Web document, embedding images and sound in a Web document, and embedding links to other Web documents.

This platform independence is one of the significant advantages of the WWW, since a web page creator need only create a single definition of a web page in HTML. Thus, no matter what sort of computer is used by a user browsing the WWW, the web page can be viewed with high quality.

The navigation model offered by the WWW is so powerful and ubiquitous that it provides a revolutionary new way to publish and access information throughout the world. One drawback of the WWW, however, is that current use is limited to computer operators. This is an enormous impediment to the WWW's reach and potential to impact human civilization. Although many people have access to computers at work, home and school, the vast majority of people in the world do not have access to computers, particularly outside the United States. Furthermore, of the computers that are in use throughout the world, a relatively small percentage are capable of browsing the WWW. Moreover, the requirement of owning a computer to access the WWW continues to be the largest force inhibiting the world from accessing the WWW because of computers' high cost, required space and complexity of operation. A solution to these drawbacks would be to develop a dedicated WWW browsing computer that utilizes a television for displaying information. Since this device would be dedicated to the function of the WWW, and would not include a disc or monitor, there could be significant cost and space savings. Moreover, it could simplify use and access of the WWW. Most importantly, since almost all homes in industrialized countries already have a television, access to the WWW using existing televisions could reach a virtually unlimited number of people. Simplicity could provide the novice with easy access to the information provided by the WWW.

In order to access, process, and display a Web document, a client uses a first set of instructions, referred to as a browser. The browser typically includes a set of browser commands corresponding to the tags available in the HTML. Each browser command in turn points to a procedure of one or more instructions defining the command which, when executed, provide a functionality of the respective command. If the client requires service from the Web server, the browser uses the Hypertext Transfer Protocol (HTTP) to communicate with the server.

The browser compares each tag found embedded in a Web document with the set of browser commands. Once a match is found, the browser executes the procedure corresponding to the matched browser command in order to provide the functionality of the respective command.

The instructions of the browsers are typically written with a programming language different from the HTML, which includes a library of several routines. The library of routines can in turn be used to develop and add new browser commands, or modify existing browser commands, which can be embedded in a Web document as new or modified tags to provide new functionality when displaying the Web document.

Various manufacturers have announced and begun producing television based WWW browsing computers including Bandai Pippin™, the Oracle NC (CR Oracle Corp.), the Viewcall Webster (CR Viewcall) and the Sega Saturn (CR Sega Corp.). However, because of the fact that WWW was originally designed for high resolution computer monitors and not for televisions, these devices provide marginal or unsatisfactory display quality for the WWW browser. One of the biggest problems is interlace image flickering. For example, interlace image flicker is a serious problem if the WWW page displayed happens to have coherent high frequencies in the vertical dimension, for example, 1-pixel wide horizontal lines, because of the interlacing techniques used by NTSC, PAL and SECAM TV systems.

Various devices, such as Bandai Pippin, generate a flicker free interlace image; however, in doing so, they blur images on the television screen unnecessarily. While some images on the WWW have coherent high frequencies that result in interlace flicker, most images do not have this problem. Conventional devices, such as the Bandai Pippin displays subsystem, uses a 1-2-1 vertical convolution to all images, resulting in blurred images due to the application of a filter technique to all images regardless of whether or not the images flicker. Furthermore, given that televisions already provide a low resolution image relative to computer monitors, unnecessary blurring takes a marginal display device and reduces its image quality even further.

One example of a device providing filtering for an interlace image is U.S. patent application No. 5,005,011 of Perlman, et al. ("'011 patent"). The filtering method disclosed in the '011 patent is one example of a filtering method commonly used in WWW browsing devices and will be referred to here for illustration. Furthermore, the '011 patent is hereby incorporated by reference as background material for the device described and claimed herein.

As taught in the '011 patent, images with coherent high frequencies in the vertical dimension that are displayed on an interlaced display are perceived by a human observer to be flickering. Flickering images are almost universally perceived by human observers as unpleasant to watch. Furthermore, prolonged viewing can result in headaches, nausea or motion sickness. Thus, viewing a web page suffering from interlace flicker for a prolonged period is undesirable.

Generally, web pages are designed for display on progressive scan computer RGB monitors. Progressive scan displays have an advantage over interlace displays, for example televisions, in that, regardless of the spatial frequency profile of a displayed image, progressive scan displays do not suffer from visually disturbing line flicker problems. Consequently, in current web page design practice, images are selected without regard to their spatial frequency profile and, as may be expected, a web page displayed without flicker reduction filtering on an interlace display will often suffer from unsightly line flicker problems.

Some images on the WWW contain the high coherent spatial frequencies in the vertical dimension that cause interlace flicker, where some do not. For example, images of natural scenes, which typically do not have coherent high frequencies, do not have flicker problems. On the other hand, images that are generated synthetically with computer drawn thin lines that have coherent high frequencies can be subject to flicker. In another example, images that are captured from video cameras which, by their nature, due to a well known video engineering in the parameter called the Kell factor, are limited in bandwidth in the spatial frequency domain so that they do not flicker.

Some images are represented by character codes rather than a specifically defined two dimensional array of pixels such as, for example, text fields. The two dimension pixel realization of such images is designed by the browser, resulting in a situation in which the same character codes may result in a different image realization from one browser to another. This can be further varied from one user to another using the same browser if the users select different fonts. For example, depending on the spatial frequency characteristics of the fonts chosen by the browser, the image generated by a text field may or may not result in interlace flicker.

One option that may be considered is pre-filtering an image before it is posted on a web with some type of flicker reduction method. Although this is a possible means to reduce interlace flicker, it has the undesirable side effect of unnecessarily blurring the posted Web page images when they are displayed on progressive scan monitors which do not suffer from line flicker. Since one of the most powerful aspects of the Web is the ability of a Web page designer to post a single Web page that can be displayed with high quality on any platform, pre-filtering an image so as to compromise its quality on a progressive scan platform is undesirable.

Therefore, a great need exists for a device that can display a video image from the WWW on a television screen with a reduction of flicker effects without unnecessarily blurring the image. As will be seen, the present invention accomplishes this in a simple and elegant manner.

SUMMARY OF THE INVENTION

A method and apparatus are provided for reducing flicker of a display image defined in HTML format for display on a television monitor. One embodiment of the present invention incorporates a tag that may be attached to an image to be displayed on a television monitor. This is done by a particular tag that designates a file name which includes object or image data stored in a file. The tag identifies an image as either having a frequency profile that will result in interlace flicker or as having a frequency profile that will not result in interlace flicker. When a World Wide Web (WWW) browser employing this embodiment encounters such a tag, it will apply flicker reduction filtering to the image when the tag identifies the image as having a frequency profile that results in interlace flicker. Otherwise, the browser displays the image without filtering.

BRIEF DESCRIPTION OF THE DRAWINGS

One embodiment of the invention is illustrated by way of example and not limitation in the figures of the accompanying drawings, in which like references indicate similar elements, and in which.

DETAILED DESCRIPTION

Figure 1:
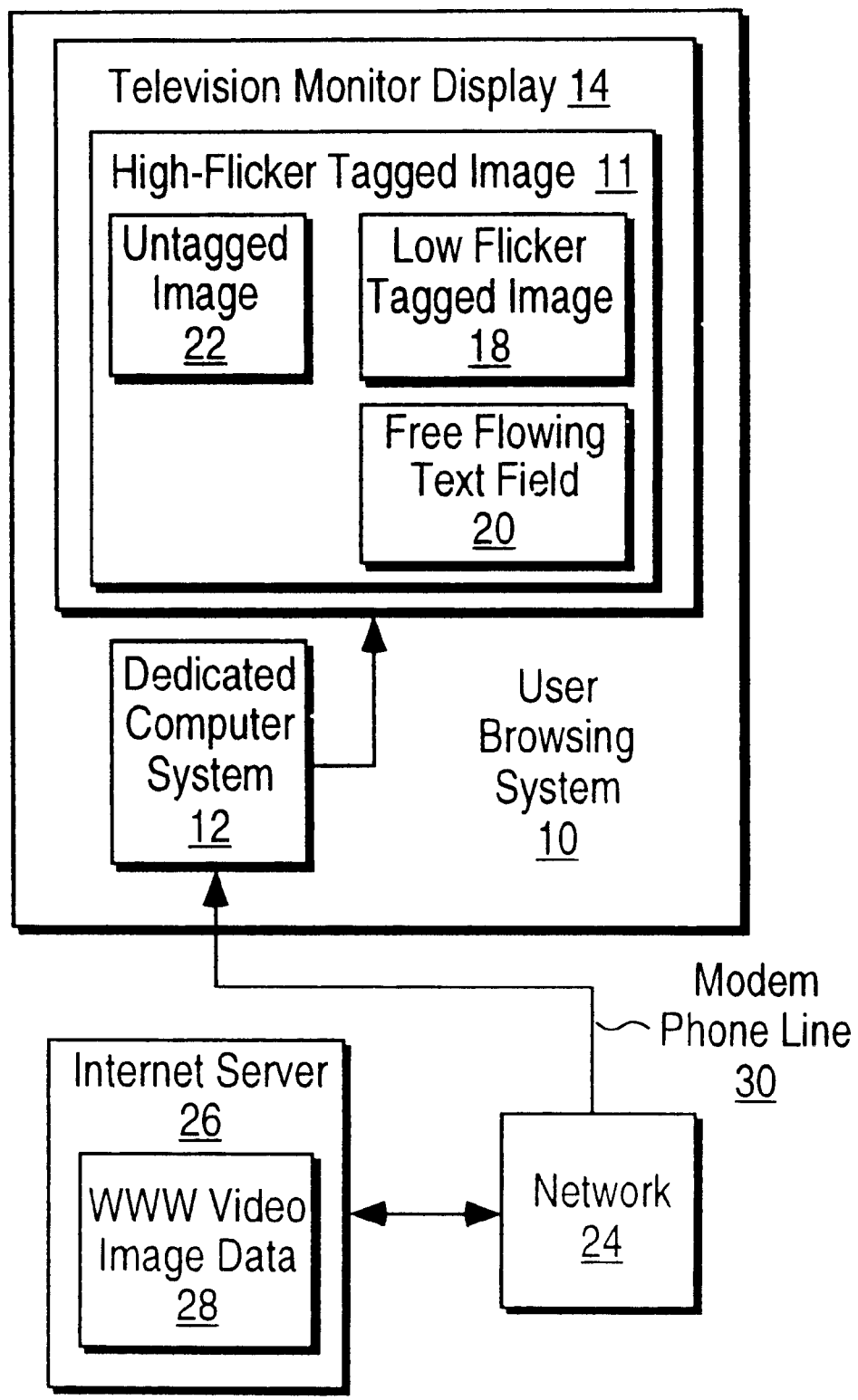
FIG. 1 illustrates a dedicated computer system, connected to a server, wherein the computer system is capable of reducing flicker when displaying HTML images on a television monitor according to one embodiment of the present invention.

One embodiment of the invention provides a method and apparatus for reducing flicker when displaying HTML defined images on a television monitor. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

One embodiment of the present invention incorporates a mechanism that filters images that have been predesignated as having a tendency to flicker when displayed on a television monitor. Images which are not predesignated, or are not subject to interlace flicker, are not filtered. The mechanism allows a web page designer to specify which images on a given web page are subject to flicker and which images are not so that images that are particularly subject to interlace flicker can be filtered in order to produce sharp images. Without such a designation, the images are displayed without special filtering.

The WWW, by nature, handles each component image of a web page as an independent object with particular characteristics defined by HTML. For example, a text field object may be specified as italic or bold face or an image may be specified as a GIF or a JPEG image. Extensions of the HTML language are continually being developed in order to add flexibility to web page design. The present invention utilizes an extension that filters objects or images that have been predesignated as having a tendency to exhibit interlace flicker.

A particular extension utilized by one embodiment employs a "tag" which may be attached to an image. The tag in HTML language is a designation mechanism that describes the characteristics of code to be incorporated in a web page. A sample code is as follows:

<HTML>
<BODY>
<TITLE>WWW Home Page for John E. Appleseed
<H1>WWW Home Page for John E. Appleseed</H1>
<IMG SRC="http://www.win.net/home4.gif"><P>
<H2>Page Under Construction!</H2>
<IMG SRC="http://www.win.net/construction.gif">
<IMG SRC="http://www.win.net/ball3d.gif">
<A HREF="http://www.win.net">Main WinNet WWW Home Page</A>
<P>To send me email use this WinNet/Internet address:
<A HREF="mailto-japple@worm.win.net">japple@worm.win.net</A>
<P>Clicking
<A HREF="ftp://ftp.win.net/winnet/worm">Anonymous FTP</A>
will examine my FTP area (ftp://ftp.win.net/winnet/worm).
</BODY>
</HTML>

This is a typical example of an algorithm in HTML language that defines a web page. A tag occurs at the beginning of a line of code and is repeated with a "/" to designate an end of the particular line of code. Each line of code is executed in order using common browser software and a web page is then displayed on a screen.

One embodiment of the present invention incorporates a tag that may be attached to an image. This is done so by a particular tag that designates a file name which includes object or image data stored in a file. This tag identifies an image as either having a frequency profile that will result in interlace flicker or as having a frequency profile that will not result in interlace flicker. When a browser employing this embodiment encounters such a tag, it will apply flicker reduction filtering to the image when the tag identifies the image as having a frequency profile that results in interlace flicker. Otherwise, the browser displays the image as is.

The following is an example of an image tag with no filtering

<IMG SRC=(file name) No Filter>

IMG designates the image tag.

"File name" is the file source ("SRC") containing image data.

"No Filter" designates that an object, in this case an image, does not need filtering for flicker reduction This particular example is for illustration and can be varied according to different applications without departing from the spirit and scope of the present invention. For example, the code could simply designate a data source without designating any filter information so that the device will display the image as is without special filtering. The television monitor may have its own internal filtering, but no further filtering will be done by the browser.

In another embodiment, a tag can specify the degree in which the image data is subject to interlace flicker. Different filtering methods, or filter kernels as they are known in the art, may be used to reduce interlace flicker to varying degrees. As described in the '011 patent, an image can be filtered using the "1-2-1 filter kernel" as well as a "1-3-1" or "1-4-1". The degree in which images can be filtered are determined by the following equation:

$$\frac{aP1 + aP2 + aP3}{2a + b}$$

Where $P_1$ is the pixel data for the first pixel of the Nth scan line, $P_2$ is the pixel data for the first pixel of the Nth+1 line, and $P_3$ is the pixel data for the third or Nth+2 scan line. "a" and "b" are constant where b is usually greater than a. In a typical application, a=1 and b=2.

In a preferred embodiment, the present invention employs two different degrees of filtering that have their own characteristic tags. Several options are available for different degrees of filtering. Options include "Slight Filter" typically used in displaying text where flickering is of minor concern and "Full Filter" typically used for filtering images where flickering effects are more pronounced.

$$\text{Full} = \frac{2 \times \text{current line} + \text{line above} + \text{line below}}{4}$$

Known as 1-2-1 as in the '011 patent. This variation is a sharper filter that can be used at the edges of images that are prone to interlace flicker.

$$\text{Slight} = \frac{6 \times \text{current line} + \text{line above} + \text{line below}}{8}$$

Known as 1-6-1. This is a variation that emphasizes the current line more and therefore reduces flicker in an amount less that the Full Filter variation. These two variations can be used in combination on a single web page in order to add varying degrees of filtering to the different objects displayed on the display screen. Further details on how to implement different degrees of filtering are shown in the '011 patent. Utilizing these methods, an image that is subject to slight interlace flicker need only be blurred slightly resulting in an optimally sharp image, whereas an object subject to extensive interlace flicker can be more extensively blurred in order to have consistently sharp images throughout the web page. Using these methods, a web page designer can specify in a tag a particular kernel to be used to reduce interlace flicker in order to have very precise control over how an image is filtered.

Furthermore, a web page designer can employ a plurality of tags in accordance with the present invention to a single image and use a region specifier, commonly used in web design, to specify a region to which a given tag will designate a particular degree of filtering. A web page designer can then specify different interlace reduction filtering for different regions of a given image in order to produce high quality images by varying the filtering throughout the image, and optimal resolution can be maintained.

Referring now to FIG. 1, a system employing a flicker reduction device in accordance with the present invention is shown. The user browsing system 10 includes a dedicated computer system 12 that has a network interface (not shown) and an internal processor (not shown). The dedicated computer system 12 is connected to a television monitor display 14 used to display the web page images. The images can be separated into different regions and handled independently by the dedicated computer system 12. For example, the display shown in FIG. 1 illustrates four page elements that are treated independently by the dedicated computer system 12. The background is a high flicker tag image 16 that would require a higher degree of filtering in order to reduce interlace flicker. Similarly, the low flicker tag image 18 would require a lower degree of filtering in order to reduce interlace flicker. The untagged image 22 and free flowing text field 20, on the other hand, would not be filtered since they are not designated for filtering.

In a simplified version of the present embodiment, the low flicker and high flicker tag images would be filtered equally since it would only distinguish between whether an image is tagged or not rather than what the degree of filtering is. A higher developed system, on the other hand, would apply varying degrees of filtering according to the respective tags. Examples of tags that employ varying degrees of filtering are as follows:

<IMG SRC=(file name) Filter=1-x-1>

The filtering designation "filter=1-x-1" can be adjusted by the web page designer by designating a value to x that will vary the degree of filtering according to the equation have parameters $P_1$, $P_2$, $P_3$, a and b discussed above.

Figure 2:
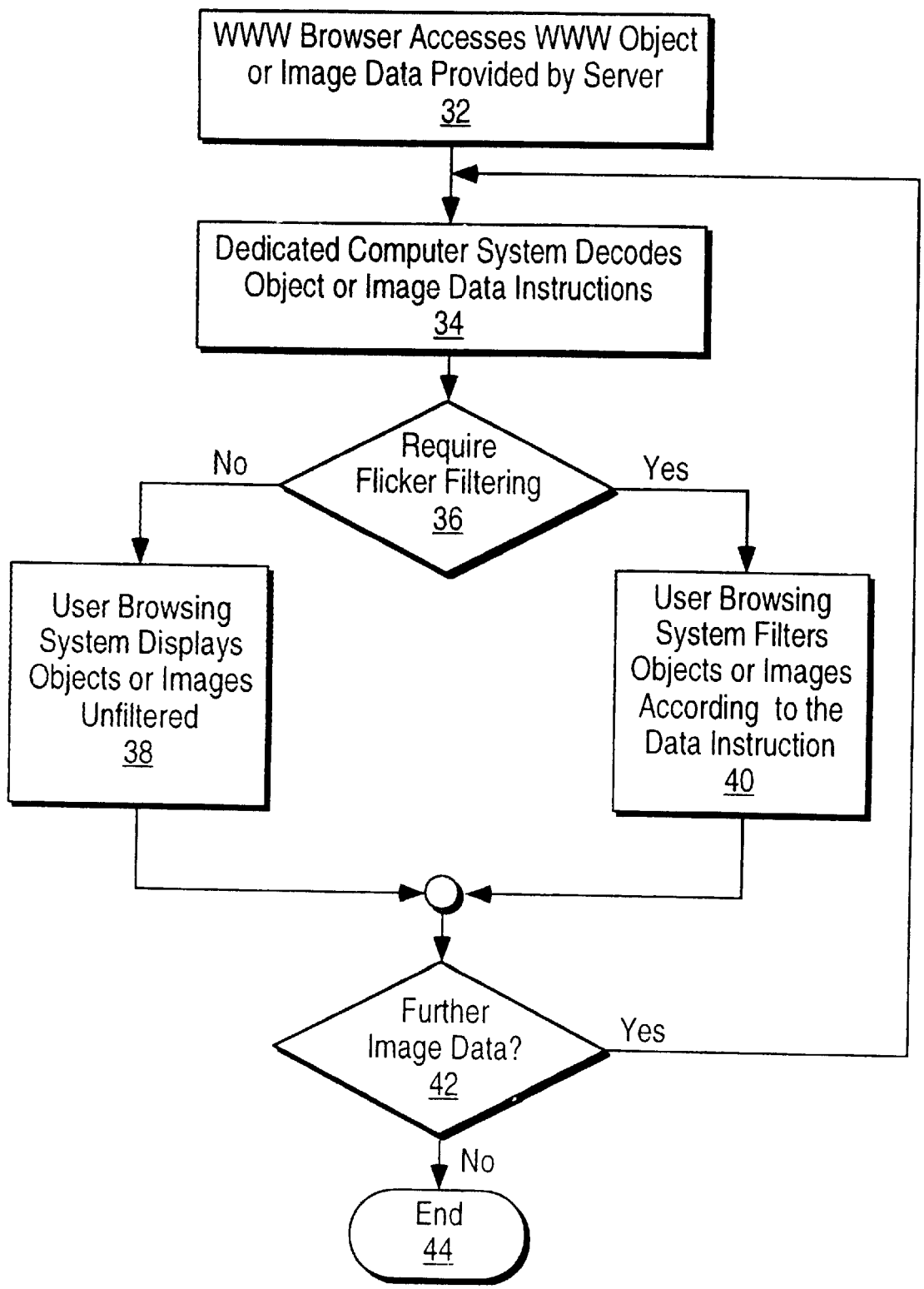
FIG. 2 illustrates a flow diagram illustrating the steps of filtering an object to be displayed in order to reduce flicker in the display image according to one embodiment of the present invention.

The user browsing system 10 is coupled to a network 24 that gives the user browsing system access to the server 26 having web page video image data 28 for display on the television monitor display 14. In normal operation, a user activates the user browsing system by accessing the network 24 using the modem phone line 30 and acquires access to the internet server 26 to retrieve the web page image data. The dedicated computer system 12 then processes the image data by executing the HTML instructions retrieved from the internet server 26 to display the image. This is illustrated in the flow diagram of FIG. 2. In the first stage 32, the user browsing system, or WWW browser, accesses the world wide web, or internet server, in order to retrieve object or image data provided by the server. In the next stage 34, dedicated computer system 12 decodes the object or image according to data instructions retrieved from the internet server. As the commands are being executed, the dedicated computer system 12 displays the web page images in response to the instructions. If no tags occur that designate flicker filtering, the user browsing system simply displays the objects or images unfiltered in step 38. On the other hand, if tags occur that designate filtering, the user browsing system in step 40 filters the objects or images according to the data instructions. Once the images are displayed, if further image data is available, the process returns to step 34 for decoding the image data. Once the image data is completed, the process ends at step 44.

In another embodiment of the present invention, a user browsing system further utilizes fonts and other non-image display elements which are appropriately designed so as not to flicker on an interlace display. When the browser downloads an image from the server, the browser determines whether the image has one or more tags such as those described above before the image is displayed on the television monitor display. If such tags occur in the HTML algorithm, the user browsing system 10 interprets the tags and applies the appropriate flicker reduction filters to the image before the image is displayed on the monitor 14. Since fonts and other non-image display elements can be designed to be flicker free by the designer of dedicated computer systems 12, there is no need to perform flicker reduction filtering prior to displaying these fonts and display elements. Therefore, this embodiment of the present invention does not filter these elements.

In another embodiment of the present invention, the user browsing system in its dedicated computer system 12 performs an analysis of the spatial frequencies of each image prior to displaying. This allows a designer to employ conventional methods in designing a web page without bothering to tag the particular images for filtering. The computer system in this embodiment analyzes the local spatial frequencies of the image and determines whether there are any coherent high spatial frequencies in the vertical dimension, the type of frequencies that will suffer from interlace flicker, and will apply a flicker filter to the region as required in order to reduce the spatial frequencies in the vertical dimension to the point where the region will not suffer from interlace flicker. Common methods of analyzing spatial frequencies are known in the art. Once the analysis and filtering are complete for the entire image, this embodiment of the present invention will display the image on a television monitor. The advantage of this embodiment incorporating the frequency analysis and filtering is that it will reduce interlace flicker and images on the web page that have not been tagged to the extent that the images require filtering. Thus, a natural image taken from a photograph will most likely require no filtering whereas a computer generated image with many horizontal lines will most likely require extensive filtering. The frequency analysis on such images would allow the web page designer to incorporate the two images in a web page with equal sharpness qualities. This embodiment, however, does not eliminate the need for tags as previously described. Common methods used to analyze the local spatial frequencies in a downloaded image have limits. It is always the case that a human observer may desire to have complete control over how an image is filtered when it is displayed. This is especially true given the artistic nature of web page design. Therefore, the combination of this automatic filtering analysis together with the filtering tags described above having explicit flicker filtering instructions will produce the most desirable web page final product.

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense. Moreover, the following claims indicate the scope of the invention, and all variations which come within the meaning and range of equivalency of the claims are to be embraced within their scope.

What is claimed is:

1. In a computer system which receives pages of information from other computer systems over a distributed network and which displays image elements and non-image elements contained in received pages to a viewer on a television display, a method for displaying the one or more elements to the viewer in a manner to reduce flicker of displayed image elements and non-image elements, the method comprising the steps of:

receiving from one of the other computer systems a page of information having a at least one image element and at least one non-image elements that can be separately identified;

analyzing said plurality of image elements and said plurality of non-image elements to determine which elements exhibit a tendency to flicker if said elements are displayed unmodified on the television display and which elements can be displayed unmodified on the television display;

if said analysis on said plurality of image elements indicates that one or more of said plurality of image elements exhibit a tendency to flicker if said image elements are displayed unmodified on said television display then modifying said one or more of said plurality of image elements to reduce the tendency to flicker by performing at least the steps of:

selecting a flicker reduction filter to be used on each one of said plurality of image elements; and applying the selected flicker reduction filter in order to reduce flicker of each one of said plurality of image elements; and displaying (i) those elements of said plurality of image elements and said plurality of non-image elements that can be displayed unmodified on the television display and (ii) each one of said plurality of image elements on the television display.

2. A method as recited in claim 1, wherein said plurality of image elements and said plurality of non-image elements are identified by HTML tags.

3. A method as recited in claim 2, wherein at least one HTML tag comprises information that identifies a flicker reduction filter that is to be applied to at least one of said plurality of image elements and said plurality of non-image elements.

4. A method as recited in claim 1, wherein the page of information us a web page comprising a plurality of HTML tags.

5. A method as recited in claim 1, wherein said analysis is a spatial analysis.

6. A computer system configured to display objects to a viewer on a television display, while reducing interlace flicker of the displayed objects, the system comprising:

a server configured to store at least one image, said image comprising web page data representative of at least one of a high-flicker tagged object, a low flicker tagged object, an untagged object, and a free flowing text object, each of which can be separately identified, at least one of which exhibits a tendency to flicker if displayed without modification on the television display;

a network in communication with said server, said network configured to allow access to and retrieval of said web page data; and a dedicated computer system in communication with said network and said television display, said computer system being configured to analyze each of said objects to identify which of a plurality of filters would reduce interlace flickering of said objects, and selectively filter at least one of said high-flicker tagged object, said low flicker tagged object, said untagged object, and said free flowing text object to reduce the interlace flicker of such objects displayed on the television display.

7. A computer system as recited in claim 6, wherein said high-flicker tagged object is a high-flicker tagged image that requires a high degree of filtering to reduce interlace flicker.

8. A computer system as recited in claim 6, wherein said low-flicker tagged object is a low-flicker tagged image that requires a low degree of filtering to reduce interlace flicker.

9. A computer system as recited in claim 6, wherein said high-flicker tagged object is a high-flicker tagged image and said low-flicker tagged object is a low-flicker tagged image, said high-flicker tagged image and said low-flicker tagged image requiring the same degree of filtering to reduce interlace flicker.

10. A computer system as recited in claim 6, wherein said untagged object and said free flowing text object are capable of being displayed unfiltered to the viewer on the television screen.

11. A computer system as recited in claim 6, wherein said objects are identified by HTML tags.

12. A computer system as recited in claim 11, wherein at least one HTML tag comprises information that identifies a flicker reduction filter that reduces the interlace flicker associated with said object.

13. A computer system as recited in claim 6, wherein said dedicated computer system uses spatial analysis to identify which of said plurality of filters would reduce interlace flickering of said objects.

* * * * *

UNITED STATES PATENT AND TRADEMARK OFFICE
CERTIFICATE OF CORRECTION

PATENT NO.     : 6,539,407 B1
DATED          : March 25, 2003
INVENTOR(S)    : Stephen G. Perlman and Bruce Leak It is certified that error appears in the above-identified patent and that said Letters Patent is hereby corrected as shown below:

Column 1,
Lines 15-16, change "patent application and patent" to -- patents --

Column 8,
Line 66, change "elements" to -- element --

Column 9,
Line 33, change "us" to -- is --

Signed and Sealed this

Sixteenth Day of September, 2003

JAMES E. ROGAN
*Director of the United States Patent and Trademark Office*